(12) United States Patent
Schertzer

(10) Patent No.: US 11,643,261 B2
(45) Date of Patent: May 9, 2023

(54) BIODEGRADABLE MULTI-PACK CARRIERS

(71) Applicant: Illinois Tool Works Inc., Glenview, IL (US)

(72) Inventor: Bryan Michael Schertzer, Geneva, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 17/175,769

(22) Filed: Feb. 15, 2021

(65) Prior Publication Data
US 2021/0269212 A1 Sep. 2, 2021

Related U.S. Application Data

(60) Provisional application No. 62/983,361, filed on Feb. 28, 2020.

(51) Int. Cl.
*B65D 71/50* (2006.01)
*B65D 65/46* (2006.01)
*C08L 3/02* (2006.01)

(52) U.S. Cl.
CPC .......... *B65D 71/504* (2013.01); *B65D 65/466* (2013.01); *C08L 3/02* (2013.01)

(58) Field of Classification Search
CPC .... B65D 71/504; B65D 65/466; B65B 17/00; B65B 27/04; B65B 13/14
USPC .................................................. 206/150, 151
See application file for complete search history.

(56) References Cited

U.S. PATENT DOCUMENTS

| 4,985,024 | A |   | 1/1991 | Sipinen |                        |
|-----------|---|---|--------|---------|------------------------|
| 5,119,955 | A | * | 6/1992 | Granofsky | B65D 17/506          |
|           |   |   |        |         | 220/254.2              |
| 5,133,755 | A | * | 7/1992 | Brekke  | A61F 2/4601            |
|           |   |   |        |         | 623/23.51              |
| 5,216,043 | A | * | 6/1993 | Sipinen | C08K 5/09              |
|           |   |   |        |         | 523/125                |
| 5,441,147 | A | * | 8/1995 | Tanner  | B65D 65/466            |
|           |   |   |        |         | 294/87.2               |
| 5,759,569 | A | * | 6/1998 | Hird    | A61L 15/30             |
|           |   |   |        |         | 428/113                |
| 5,934,495 | A | * | 8/1999 | Chiodo  | B65D 25/36             |
|           |   |   |        |         | 220/257.2              |

(Continued)

FOREIGN PATENT DOCUMENTS

EP   1440902 A1   7/2004
GB   2485895 A    5/2012

(Continued)

OTHER PUBLICATIONS

Ammala et al., "An Overview of Degradable and Biodegradable Polyolefins," Progress in Polymer Science 36 (2011) 1015-1049.

(Continued)

*Primary Examiner* — Jacob K Ackun
(74) *Attorney, Agent, or Firm* — Maxwell J. Petersen; FisherBroyles, LLP

(57) ABSTRACT

A biodegradable flexible container carrier is formed using a biodegradable plastic material that defines an array of apertures for receiving beverage containers. The biodegradable plastic material includes at least one of a) a polyolefin mixed with a prodegradant additive, b) a polyolefin extruded with a biodegradable co-resin, and c) a biodegradable structural polymer.

22 Claims, 1 Drawing Sheet

(56) References Cited

U.S. PATENT DOCUMENTS

| | | | | |
|---|---|---|---|---|
| 6,182,821 | B1* | 2/2001 | Olsen | B65D 71/504 |
| | | | | 206/427 |
| 6,443,323 | B1* | 9/2002 | DeRose | B65D 17/4012 |
| | | | | 220/257.1 |
| 6,482,872 | B2* | 11/2002 | Downie | C08K 5/0033 |
| | | | | 523/124 |
| 8,418,844 | B2* | 4/2013 | Slaters, Jr. | B65D 71/504 |
| | | | | 206/427 |
| 9,920,181 | B2* | 3/2018 | Takahashi | C08G 63/06 |
| 2002/0011423 | A1 | 1/2002 | Weaver | |
| 2002/0088802 | A1* | 7/2002 | DeRose | B65D 17/4012 |
| | | | | 220/729 |
| 2003/0236371 | A1 | 12/2003 | Wilson | |
| 2008/0245680 | A1* | 10/2008 | Olsen | B65D 71/504 |
| | | | | 206/139 |
| 2009/0320364 | A1* | 12/2009 | MacKenzie | A01G 20/00 |
| | | | | 47/65.9 |
| 2011/0100854 | A1* | 5/2011 | Chapin | B65D 85/00 |
| | | | | 206/459.5 |
| 2011/0135856 | A1* | 6/2011 | Bell | A01G 9/026 |
| | | | | 428/192 |
| 2012/0133033 | A1 | 5/2012 | Wang | |
| 2014/0300026 | A1* | 10/2014 | Taccolini | B65D 71/0003 |
| | | | | 264/129 |
| 2015/0108014 | A1* | 4/2015 | Olsen | B65D 71/504 |
| | | | | 206/161 |
| 2015/0147547 | A1* | 5/2015 | Schleicher, Jr. | B41M 5/504 |
| | | | | 156/60 |
| 2016/0236813 | A1* | 8/2016 | Chapin | B65D 41/46 |
| 2017/0259976 | A1* | 9/2017 | Lee | A45F 5/00 |
| 2018/0111735 | A1 | 4/2018 | Olsen | |
| 2018/0170638 | A1* | 6/2018 | Patton | B65D 71/50 |
| 2018/0362234 | A1* | 12/2018 | L'Heureux | B65B 61/16 |
| 2019/0119019 | A1* | 4/2019 | Patton | G09F 23/00 |
| 2019/0390020 | A1* | 12/2019 | Ferris | C08L 67/02 |
| 2020/0102139 | A1* | 4/2020 | Jobe | B65D 65/466 |
| 2020/0199354 | A1* | 6/2020 | Dali | C12N 9/18 |
| 2020/0223608 | A1 | 7/2020 | Samaras et al. | |
| 2020/0256608 | A1* | 8/2020 | Fladoos | C09J 11/06 |
| 2021/0016290 | A1* | 1/2021 | Motadel | B65D 25/108 |
| 2021/0047095 | A1* | 2/2021 | Munoz Saiz | B65D 21/0227 |
| 2021/0061502 | A1* | 3/2021 | Johnston | B65D 71/42 |
| 2021/0269212 | A1* | 9/2021 | Schertzer | B65D 65/466 |

FOREIGN PATENT DOCUMENTS

| | | |
|---|---|---|
| WO | 2009016083 | 2/2009 |
| WO | 2013/019834 | 2/2013 |

OTHER PUBLICATIONS

BASF, "Ecovio(R) Certified Compostable Polymer With Biobased Content," Brochure, 24 pages, Sep. 2019.
Wikipedia, "Biodegradable Plastic," https://en.wikipedia.org, 18 pages, downloaded Feb. 11, 2020.
Microdyne Plastics Inc., "Earth Friendly Plastic Polymers and Resins," Brochure, 6 pages, copyright 2018.
Science Direct, "Polyolefin—An Overview," https://www.sciencedirect.com/topics/agricultural-and-biological-sciences/polyolefin, 12 pages, downloaded Feb. 12, 2020.
International Search Report and Opinion for PCT/US21/019157, dated Apr. 12, 2021.
Written Opinion of the International Searching Authority for PCT/US2021/019157, dated Aug. 30, 2022.

* cited by examiner

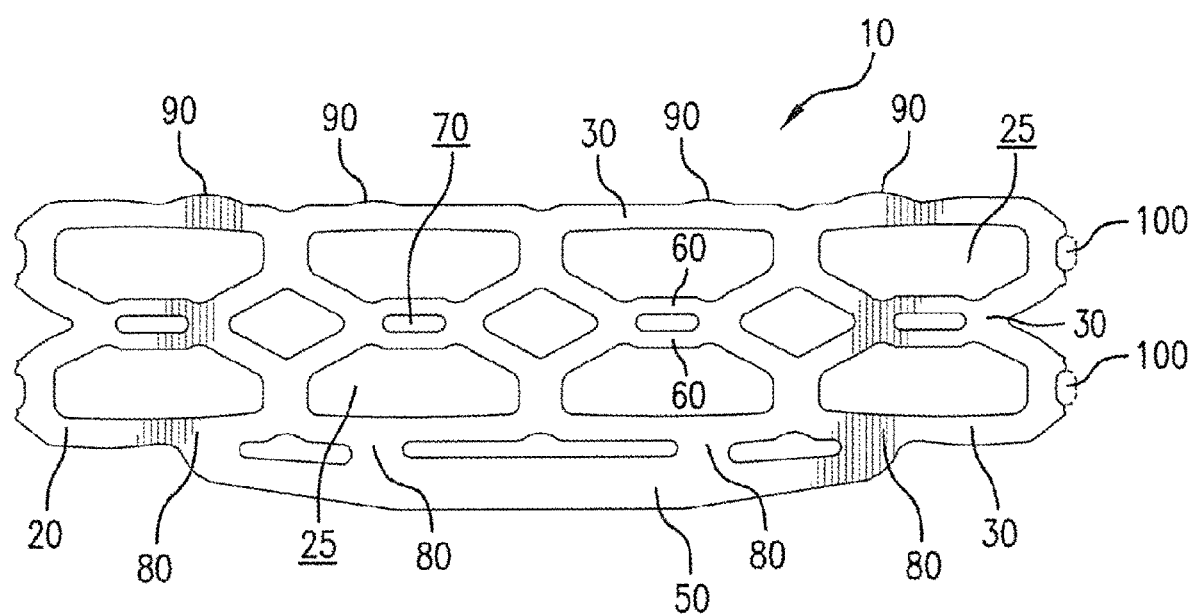

BIODEGRADABLE MULTI-PACK CARRIERS

RELATED APPLICATIONS

This patent application claims priority to U.S. Provisional Application Ser. No. 62/983,361, filed Feb. 28, 2020, the disclosure of which is incorporated herein by reference.

FIELD OF THE INVENTION

This invention is directed to plastic film-based container carriers that are biodegradable and/or compostable.

BACKGROUND OF THE INVENTION

Flexible plastic film-based container carriers are used to carry an array of beverage containers in which the individual beverage containers can be removed by pulling the beverage container away from the array, causing the plastic to stretch. Typical flexible container carriers include a plurality of flexible bands defining an array of apertures for receiving beverage containers. The apertures can be oval, round, rectangular or variable in shape and the array may include four, six, eight, twelve or more apertures used to receive corresponding beverage containers in a multi-package. The flexible container carriers may also include a flexible handle that extends upwardly or laterally from the array to enable a consumer to carry the multi-package from the top or side(s).

Removing individual containers from the array typically stretches, ruptures or otherwise damages the flexile container carrier, and the flexible container carriers are typically disposed of after a single use. Conventional carriers are thus formed from a variety of relatively low-cost flexible plastic materials such as low and high density polyethylene, linear low density polyethylene, polypropylene homopolymers and copolymers, ethylene vinyl acetate, and combinations thereof. The specific polymer used varies depending on the size, shape and weight of the containers being carried, the number of containers in the array, and the handling procedures employed during manufacture, shipping and stocking. While these polymer materials are recyclable, they are typically not biodegradable and will require an extremely long or indefinite time to decompose in most environments.

With the increasing space required for landfills and the environmental risks caused by littering and long-term storage of waste, there is a trend towards using biodegradable materials such as engineered paper to replace plastic straws and cups, and other disposable plastic items. Yet flexible plastic materials offer several advantages in flexible container carriers due to the requirements of strength, flexibility, stretchability, and ability to withstand exposure to water and moisture. There is thus a need or desire for flexible container carriers that are biodegradable and/or compostable, while still meeting the foregoing requirements of strength, flexibility, stretchability, and ability to withstand water and moisture.

SUMMARY OF THE INVENTION

The present invention is directed to a biodegradable flexible container carrier formed using a biodegradable plastic material that maintains the desirable features of standard plastic container carriers. The biodegradable flexible container carrier provides flexibility, strength, stretchability and withstands routine exposure to water and moisture, with the added benefit of biodegradability.

In one embodiment, the invention is directed to a biodegradable flexible container carrier that includes:
a plurality of flexible bands defining an array of apertures for receiving beverage containers;
the flexible bands arranged in longitudinal and transverse directions and defining the apertures therebetween;
wherein the flexible bands include a biodegradable plastic material.

In another embodiment, the invention is directed to a biodegradable flexible container carrier that includes:
a biodegradable flexible sheet including a biodegradable plastic material and defining an array of apertures for receiving beverage containers and at least one carrying handle affixed to the array of apertures;
wherein the biodegradable plastic material includes at least one of a) a polyolefin mixed with a prodegradant additive, b) a polyolefin extruded with a biodegradable co-resin, and c) a biodegradable structural polymer.

In another embodiment, the invention is directed to a method of making a biodegradable flexible container carrier. The method includes the steps of:
forming a plurality of flexible bands defining an array of apertures for receiving beverage containers using a biodegradable plastic material;
the flexible bands arranged in longitudinal and transverse directions and defining the apertures therebetween;
wherein the biodegradable plastic material includes at least one of a) a polyolefin mixed with a prodegradant additive, b) a polyolefin extruded with a biodegradable co-resin, and c) a biodegradable structural polymer.

The biodegradable flexible container carrier can be used for storage of multipacks of a wide variety of beverage containers including without limitation soft drink cans and bottles, beer cans and bottles, juice containers, water and sparkling water containers, and the like. The biodegradable flexible container carrier can be designed with any number of container-receiving apertures in the array, for example four, six, eight, ten, and twelve or more container-receiving apertures. The apertures can be arranged in a single row or multiple rows. The biodegradable flexible container carrier can include one or more handles extending outward and/or upward from the container carrier and the handles can be formed of the biodegradable plastic material.

When the biodegradable flexible container carrier is used up (i.e., when all the beverage containers are removed), it can be disposed of using any conventional technique and will biodegrade in a reasonable period, typically measured in months, during exposure to various weather conditions. Biodegradation can result from heat, moisture, sunlight and/or enzymes that shorten and weaken the polymer chains. The use of biodegradable plastic materials provides an environmentally safe alternative to storage and recycling of the biodegradable flexible container carriers.

The foregoing characteristics and advantages of the invention will become further apparent from the following Detailed Description, read in conjunction with the drawing.

BRIEF DESCRIPTION OF THE DRAWING

FIG. 1 is a plan view of an exemplary biodegradable flexible container carrier that can be formed using a biodegradable plastic material according to the invention.

DETAILED DESCRIPTION OF THE INVENTION

The present invention is directed to a biodegradable flexible container carrier and a method of making it. FIG. 1 is just one example of many biodegradable flexible container carriers that fall within the scope of the invention. The illustrated biodegradable flexible container carrier 10 may be formed within a single layer of biodegradable flexible sheet 20 having a length and width defining therein an array of container receiving apertures 25. Although eight container receiving apertures 25 are illustrated, the biodegradable flexible container carrier 10 can be designed with four, six, eight, ten, twelve, or any number of container receiving apertures 25. The container receiving apertures 25 are defined between longitudinal and transverse flexible bands 30 formed of biodegradable plastic material. The illustrated embodiment includes three of the longitudinal bands 30 connected by four of the transverse bands 30, each having a configuration suitable for capturing and storing two parallel rows of the desired beverage containers.

A handle 50 extends from one longitudinal edge of biodegradable flexible container carrier 10 and may include one or more apertures along the longitudinal edge that permit grasping of the handle by a user. The handle 50 is connected to the nearest longitudinal flexible band 30 at two or more connection points 80. The longitudinal flexible band 30 that is located opposite the handle 50 includes a plurality of thickened sections 90 that provide additional strength to the regions of the flexile carrier 10 that carry the greatest weight when the fully loaded flexible carrier 10 is lifted using the handle 50. The central longitudinal flexible band 30 includes flaps 60 defining small apertures 70 that further enhance the ability of the biodegradable flexible container carrier 10 to capture and maintain suitably sized beverage containers within the array of apertures 25. A multi-package 100 is defined by a combination of the biodegradable flexible carrier 10 and the beverage containers (not shown) that are stored within the apertures 25.

According to the invention, the flexible bands 30 are formed using a biodegradable plastic material. In one embodiment, the entire flexible container carrier 10 is formed using a biodegradable plastic material. In one embodiment, the biodegradable plastic material includes a mixture that includes a polyolefin mixed with a prodegradant additive that facilitates and accelerates the decomposition of the polyolefin. Prodegradant additives attack polyolefin molecular chains by weakening and/or cutting the intermolecular bonds to a degree that eventually may allow phagocytosis by microorganisms in the environment.

Suitable polyolefins include without limitation low density polyethylene, high density polyethylene, linear low density polyethylene, polypropylene, propylene-ethylene copolymers, and combinations thereof. The polyolefin may be combined with an elastomer such as an ethylene-alpha olefin copolymer or a propylene-alpha olefin copolymer, each having an alpha-olefin content of about 10% by weight or greater, a styrene-butadiene elastomer, a styrene-ethylene-butadiene-styrene-elastomer, or another elastomer to add increased flexibility and stretchability to the flexible bands 30 and/or carrier 10. When used, the elastomer can be present at up to about 20% by weight, or up to about 15% by weight, or up to about 10% by weight, or up to about 5% by weight of the mixture.

Suitable prodegradant additives include without limitation alkokylated ethylenically unsaturated compounds, alkoxylated ethylenically saturated compounds, benzophenones, peroxides, transition metal salts and combinations thereof. The prodegradant additive can be combined with the polyolefin or polyolefin/elastomer combination using any suitable mixing technique and is suitably present at about 0.10% to about 10% by weight, or about 0.5% to about 10% by weight, or about 0.15% to about 5% by weight, or about 0.5% to about 5% by weight, or about 0.25% to about 2% by weight, or about 1% by weight of the mixture. In one embodiment, the prodegradant additive combines with the polyolefin to produce an oxo-degradable polyolefin material. The reaction mechanism of the pro-degradant additives is based on the oxidative degradation of the polyolefin and (if included) elastomer through the reaction of the molecular oxygen present in the atmosphere with free radicals generated in the polymer molecule by light and heat. The oxo-degradation is an abiotic process and, thanks to the incorporation of oxygen in the polyethylene molecule, functional groups that contribute to the generation of peroxides and hydroperoxides are formed. This effect can be measured by the carbonyl content. As a result of the oxidation, the characteristics of the polymer change from hydrophobic to hydrophilic, giving rise to fragmentation in the material and the subsequent absorption of moisture. The carbonyl groups, which are products of the reaction of radicals generated by the oxidation of the material additive, cause the weakening and splitting of the polymer chains.

Examples of suitable prodegradant additives include without limitation d2w, sold by Symphony Environmental of the United Kingdom, and 10365-16, sold by ColorTech, Inc. of Morristown, Tenn., both of which can be added in the amounts stated above. Symphony d2w is represented as an oxo-biodegradable plastic that can be used as an additive in plastics to promote biodegradability. ColorTech 10365-16 is a proprietary prodegradant additive.

In another embodiment, the biodegradable plastic material includes a combination of a polyolefin and a biodegradable co-resin that renders the polyolefin biodegradable. The polyolefin can be any of the polyolefins described above, alone or in combination with an elastomer as described above. One difference between a biodegradable co-resin and a prodegradant additive is that the biodegradable co-resin forms a more significant percentage of the combination. Also, the biodegradable co-resin can either be mixed with the polyolefin or, in some embodiments, coextruded with the polyolefin as a separate but adjacent layer to form the combination. In one embodiment, the combination includes about 10% to about 50% by weight of the biodegradable co-resin and about 50% to about 90% of the polyolefin or polyolefin/elastomer mixture. In another embodiment, the combination includes about 15% to about 30% by weight of the biodegradable co-resin and about 70% to about 85% by weight of the polyolefin or polyolefin/elastomer mixture.

Suitable biodegradable co-resins include without limitation starches and starch derivatives, including modified starch. Combining polyolefins with biodegradable co-resins such as starches, for example, enhances the biodegradability of the polyolefins. Starch is a hydrophilic material that degrades easily when exposed to moisture or a biotic environment. The hydrolysis of starch renders the polyolefin structure porous, thereby increasing the polymer surface accessible for attack by biotic and abiotic factors and accelerating the natural degradation process. In still another embodiment, a quantity of biodegradable co-resin such as starch can be used in combination with any of the prodegradants described above.

In another embodiment, the biodegradable plastic material can include a biodegradable structural polymer. In one embodiment, the biodegradable structural polymer can be combined with a polyolefin or polyolefin/elastomer mixture, a biodegradable co-resin, and/or a pro-degradant as described above. In another embodiment, the biodegradable structural polymer can be a stand-alone structural polymer that is not used in combination with a polyolefin, polyolefin/elastomer mixture, or other structural polymer. Suitable biodegradable structural polymers include without limitation polymers of organic acids, polymers of organic esters, polymers of hydroxyalkanoates, biopolymers, and combinations thereof. Examples include without limitation hydrophilic polymers, including vinyl ketone copolymers such as ethylene-co-methyl vinyl ketone and ethylene-co-methyl isopropyl ketone copolymers; carbonyl-containing copolymers such as ethylene-carbon monoxide copolymers; unsaturated polyesters and copolyesters; polyols of unsaturated ethylene alcohols such as geraniol, linalool, citronellol, allyl alcohol and furfuryl alcohol; and combinations thereof.

Examples of suitable biodegradable structural polymers include without limitation Ecovio® resin sold by BASF and Mater-Big resin sold by Novamont. Ecovio® resins combine suitable amounts of biobased resins, for example polylactic acid, with BASF's compostable Ecoflex®, which is believed to contain a blend of recycled polymers and wood by-products, to form a flexible biopolymer suitable for forming the biodegradable multi-pack carriers. Mater-Big resins are biopolymers containing starches, cellulose, vegetable oils and biodegradable hydrophilic polymers such as modified PVOH and aliphatic polyesters.

The invention is also directed to a method of making a biodegradable flexible container carrier. A plastic sheet formed of any of the foregoing biodegradable plastic materials can be used to form a plurality of flexible bands defining an array of apertures for receiving individual beverage containers. The flexible bands can be arranged both the longitudinal and transverse directions to define the container-receiving apertures therebetween. As explained above, the biodegradable plastic material can include at least one of a) a polyolefin mixed with a prodegradant additive, b) a polyolefin extruded with a biodegradable co-resin, and c) a biodegradable structural polymer.

The embodiments of the invention described herein are exemplary, and various modifications and improvements can be made without departing from the spirit and scope of the invention. The scope of the invention is defined by the appended claims, and all changes that fall within the meaning and range of equivalents are intended to be embraced therein.

I claim:

1. A single-use, disposable biodegradable plastic flexible container carrier, comprising:
    a plurality of flexible bands defining an array of apertures therebetween for receiving beverage containers;
    the flexible bands arranged in longitudinal and transverse directions and defining the apertures therebetween;
    wherein the flexible bands comprise a biodegradable plastic material and removal of individual beverage containers from the apertures stretches, ruptures or otherwise damages the flexible container carrier, rendering the flexible container carrier disposable after a single use;
    wherein the biodegradable plastic material comprises about 50% to 99.9% by weight of a polyolefin combined with at least one of a) 0.10% to about 10% by weight of a prodegradant additive that renders the polyolefin biodegradable by attacking molecular chains in the polyolefin to cause weakening and/or cutting of intermolecular bonds in the molecular chains and b) about 10% to about 50% by weight of a biodegradable co-resin that renders the polyolefin biodegradable by making the polyolefin porous, thereby increasing a polyolefin surface accessible for attack by biotic and abiotic factors.

2. The biodegradable flexible container carrier of claim 1, wherein the biodegradable plastic material comprises the polyolefin mixed with the prodegradant additive.

3. The biodegradable flexible container carrier of claim 1, wherein the polyolefin is selected from the group consisting of low density polyethylene, high density polyethylene, linear low density polyethylene, polypropylene, propylene-ethylene copolymers, and combinations thereof.

4. The biodegradable flexible container carrier of claim 1, wherein the biodegradable plastic material comprises the prodegradant additive and the prodegradant additive is selected from the group consisting of alkoxylated ethylenically unsaturated compounds, alkoxylated ethylenically saturated compounds, benzophenones, peroxides, transition metal salts, and combinations thereof.

5. The biodegradable flexible container carrier of claim 1, wherein the biodegradable plastic material comprises the prodegradant additive and the prodegradant additive combines with the polyolefin to produce an oxo-biodegradable plastic.

6. The biodegradable flexible container carrier of claim 2, wherein the prodegradant additive is added to the polyolefin at a concentration of about 0.15% to about 5% by weight.

7. The biodegradable flexible container carrier of claim 2, wherein the prodegradant additive is added to the polyolefin at a concentration of about 0.25% to about 2% by weight.

8. The biodegradable flexible container carrier of claim 1, wherein the biodegradable plastic material comprises a combination of the polyolefin and the biodegradable co-resin that renders the polyolefin biodegradable.

9. The biodegradable flexible container carrier of claim 8, wherein the biodegradable co-resin is selected from the group consisting of starches, starch derivatives, and combinations thereof.

10. The biodegradable flexible container carrier of claim 8, wherein the combination includes about 10% to about 50% by weight of the biodegradable co-resin and about 50% to about 90% by weight of the polyolefin.

11. The biodegradable flexible container carrier of claim 8, wherein the combination includes about 15% to about 30% by weight of the biodegradable co-resin and about 70% to about 85% by weight of the polyolefin.

12. The biodegradable flexible carrier of claim 1, wherein the biodegradable plastic material further comprises a biodegradable structural polymer.

13. The biodegradable flexible carrier of claim 12, wherein the biodegradable structural polymer is selected from the group consisting of polymers of organic acids, polymers of organic esters, polymers of hydroxyalkanoates, biopolymers, and combinations thereof.

14. The biodegradable flexible carrier of claim 12, wherein the biodegradable structural polymer comprises polylactic acid, recycled polymer, and wood by-product.

15. The biodegradable flexible carrier of claim 12, wherein the biodegradable structural polymer comprises starch, a hydrophilic polymer, and an aliphatic polyester.

16. A single-use, disposable biodegradable plastic flexible container carrier, comprising:
    a biodegradable flexible sheet including a biodegradable plastic material and defining an array of apertures for receiving beverage containers;
    wherein the biodegradable plastic material comprises at least one of a) about 70% to 99.9% by weight of a polyolefin mixed with zero to about 20% by weight of an elastomer and 0.10% to about 10% by weight of a prodegradant additive that renders the polyolefin biodegradable by attacking molecular chains in the polyolefin to cause weakening and/or cutting of intermolecular bonds in the molecular chains, and b) a layer of a polyolefin coextruded with a layer of a biodegradable co-resin that renders that polyolefin biodegradable by making the polyolefin porous, thereby increasing a polyolefin surface accessible for attack by biotic and abiotic factors, and removal of individual beverage containers from the apertures stretches, ruptures or otherwise damages the flexible container carrier, rendering the flexible container carrier disposable after a single use.

17. The biodegradable flexible container carrier of claim 16, wherein the biodegradable flexible sheet defines a plurality of flexible bands arranged in longitudinal and transverse directions;

the flexible bands defining the array of apertures therebetween.

18. The biodegradable flexible container carrier of claim 16, wherein the biodegradable plastic material comprises the polyolefin mixed with the prodegradant additive; and the prodegradant additive is selected from the group consisting of alkoxylated ethylenically unsaturated compounds, alkoxylated ethylenically saturated compounds, benzophenones, peroxides, transition metal salts, and combinations thereof.

19. The biodegradable flexible container carrier of claim 16, wherein the biodegradable plastic material comprises the layer of polyolefin coextruded with the layer of biodegradable co-resin; and the biodegradable co-resin comprises a modified starch.

20. The biodegradable flexible container carrier of claim 16, wherein the biodegradable plastic material further comprises a biodegradable structural polymer; and the biodegradable structural polymer is selected from the group consisting of polymers of organic acids, polymers of organic esters, polymers of hydroxyalkanoates, biopolymers, and combinations thereof.

21. The biodegradable flexible container carrier of claim 16, further comprising at least one carrying handle affixed to the array of apertures.

22. A method of making a single-use, disposable biodegradable plastic flexible container carrier, comprising the steps of:

forming a plurality of flexible bands defining an array of apertures for receiving beverage containers using a biodegradable plastic material;

the flexible bands arranged in longitudinal and transverse directions and defining the apertures therebetween;

wherein the biodegradable plastic material comprises at least one of a) about 70% to 99.9% by weight of a polyolefin mixed with zero to about 20% by weight of an elastomer and 0.10% to about 10% by weight of a prodegradant additive that renders the polyolefin biodegradable by attacking molecular chains in the polyolefin to cause weakening and/or cutting of intermolecular bonds in the molecular chains, and b) a layer of a polyolefin extruded with a layer of a biodegradable co-resin that renders that polyolefin biodegradable by making the polyolefin porous, thereby increasing a polyolefin surface accessible for attack by biotic and abiotic factors, and removal of individual beverage containers from the apertures stretches, ruptures or otherwise damages the flexible container carrier, rendering the flexible container carrier disposable after a single use.

* * * * *